(12) United States Patent
Yeh

(10) Patent No.: US 12,346,572 B2
(45) Date of Patent: Jul. 1, 2025

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 55 days.

(21) Appl. No.: 18/073,581

(22) Filed: Dec. 2, 2022

(65) Prior Publication Data
US 2024/0143190 A1 May 2, 2024

(30) Foreign Application Priority Data
Nov. 2, 2022 (TW) .................................. 111141736

(51) Int. Cl.
*G06F 3/06* (2006.01)

(52) U.S. Cl.
CPC .......... *G06F 3/0619* (2013.01); *G06F 3/0607* (2013.01); *G06F 3/0659* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595;
(Continued)

(56) References Cited

U.S. PATENT DOCUMENTS

| 9,141,296 | B2 * | 9/2015 | Marcu | G06F 3/0659 |
| 9,569,320 | B2 * | 2/2017 | Werner | G06F 3/0679 |
| 9,703,527 | B2 * | 7/2017 | Shaharabany | G06F 3/0679 |
| 2007/0171714 | A1 * | 7/2007 | Wu | G06F 11/1072 |
| | | | | 714/E11.038 |

(Continued)

FOREIGN PATENT DOCUMENTS

TW 201216288 4/2012

OTHER PUBLICATIONS

Z. Han, H. Jiang, S. Jiang, Y. Tan and H. Luo, "SES-Dedup: a Case for Low-Cost ECC-based SSD Deduplication," 2019 35th Symposium on Mass Storage Systems and Technologies (MSST), Santa Clara, CA, USA, 2019, pp. 292-298, doi: 10.1109/MSST.2019.00009. (Year: 2019).*

(Continued)

*Primary Examiner* — Daniel C. Chappell
(74) *Attorney, Agent, or Firm* — JCIPRNET

(57) ABSTRACT

A memory management method, a memory storage device, and a memory control circuit unit are disclosed. The method includes: receiving first data from a host system; encoding the first data to generate first parity data based on a first code rate; storing the first data and the first parity data in a plurality of first physical management units; collecting second data from a rewritable non-volatile memory module; encoding the second data to generate second parity data based on a second code rate, wherein the first code rate is different from the second code rate; and storing the second data and the second parity data in a plurality of second physical management units.

15 Claims, 9 Drawing Sheets

(58) Field of Classification Search
CPC ...... G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 2007/0171730 A1* | 7/2007 | Ramamoorthy | H03M 13/1515 365/185.33 |
| 2009/0217136 A1* | 8/2009 | Cheng | G06F 11/1068 714/E11.032 |
| 2011/0197014 A1* | 8/2011 | Yeh | G06F 12/0246 711/E12.078 |
| 2014/0013033 A1* | 1/2014 | Sharon | G11C 11/5628 711/103 |
| 2017/0003897 A1* | 1/2017 | Yan | G06F 3/061 |
| 2018/0019765 A1* | 1/2018 | Hsiao | G11C 16/14 |
| 2019/0295681 A1* | 9/2019 | Kim | G11C 29/42 |

OTHER PUBLICATIONS

"Office Action of Taiwan Counterpart Application", issued on Jun. 20, 2023, p. 1-p. 6.

* cited by examiner

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 111141736, filed on Nov. 2, 2022. The entirety of the above-mentioned patent application is hereby incorporated by reference herein and made a part of this specification.

BACKGROUND OF THE INVENTION

Field of the Invention

The invention relates to a memory management method, a memory storage device, and a memory control circuit unit.

Description of Related Art

Mobile phones, tablets, and notebook computers have grown rapidly in recent years, resulting in a rapid increase in consumer demand for storage media. Since a rewritable non-volatile memory module (such as a flash memory) has characteristics such as data non-volatility, power-saving, small size, and lack of mechanical structures, the rewritable non-volatile memory module is very suitable to be built into the various portable multimedia devices provided above.

Certain types of rewritable non-volatile memory modules support data encoding and decoding across physical units (e.g., across physical pages). For example, the data in K physical pages is encoded across physical pages to generate parity data in one physical page. Then, the data in the K physical pages and the parity data in the one physical page may be configured to jointly protect the data in the K physical pages via a cross-physical page data protection technique. Compared with the data protection technique of a single physical page, the cross-physical page data protection technique may further improve data protection capability (and error correction capability). However, for a single rewritable non-volatile memory module, the value of the above K is often fixed. As a result, some system resources (such as data transmission bandwidth and storage space) are wasted in different operating situations.

SUMMARY OF THE INVENTION

The invention provides a data storage method, a memory storage device, and a memory control circuit unit that may optimize the data encoding and storage mechanism in different data writing situations.

An exemplary embodiment of the invention provides a data storage method configured for a rewritable non-volatile memory module. The rewritable non-volatile memory module includes a plurality of physical management units. The data storage method includes: receiving first data from a host system; encoding the first data to generate first parity data based on a first code rate; storing the first data and the first parity data in a plurality of first physical management units in the plurality of physical management units; collecting second data from a rewritable non-volatile memory module; encoding the second data to generate second parity data based on a second code rate, wherein the first code rate is different from the second code rate; and storing the second data and the second parity data in a plurality of second physical management units in the plurality of physical management units.

An exemplary embodiment of the invention further provides a memory storage device including a connection interface unit, a rewritable non-volatile memory module, and a memory control circuit unit. The connection interface unit is configured to be coupled to a host system. The rewritable non-volatile memory module includes a plurality of physical management units. The memory control circuit unit is coupled to the connection interface unit and the rewritable non-volatile memory module. The memory control circuit unit is configured to: receive first data from the host system; encode the first data to generate first parity data based on a first code rate; send a first write command sequence indicating storing the first data and the first parity data in a plurality of first physical management units in the plurality of physical management units; collect second data from a rewritable non-volatile memory module; encode the second data to generate second parity data based on a second code rate, wherein the first code rate is different from the second code rate; and sending a second write command sequence indicating storing the second data and the second parity data in a plurality of second physical management units in the plurality of physical management units.

An exemplary embodiment of the invention further provides a memory control circuit unit configured to control a rewritable non-volatile memory module. The rewritable non-volatile memory module includes a plurality of physical management units. The memory control circuit unit includes a host interface, a memory interface, an error detection and correction circuit, and a memory management circuit. The host interface is configured to be coupled to a host system. The memory interface is configured to be coupled to the rewritable non-volatile memory module. The memory management circuit is coupled to the host interface, the memory interface, and the error detection and correction circuit. The memory management circuit is configured to receive first data from the host system. The error detection and correction circuit is configured to encode the first data based on a first code rate to generate first parity data. The memory management circuit is further configured to send a first write command sequence instructing storing the first data and the first parity data in a plurality of first physical management units in the plurality of physical management units. The memory management circuit is further configured to collect second data from the rewritable non-volatile memory module. The error detection and correction circuit is further configured to encode the second data based on a second code rate to generate second parity data, wherein the first code rate is different from the second code rate. The memory management circuit is further configured to send a second write command sequence instructing storing the second data and the second parity data in a plurality of second physical management units in the plurality of physical management units.

Based on the above, after the first data is received from the host system, the first data may be encoded based on the first code rate to generate the first parity data, and the first data and the first parity data may be stored in the plurality of first physical management units in the rewritable non-volatile memory module. Moreover, after the second data is collected from the rewritable non-volatile memory module, the second data may be encoded based on the second code rate to generate the second parity data, and the second data and the second parity data may be stored in the plurality of second physical management units in the rewritable non-volatile memory module. In particular, the first code rate is different from the second code rate. By using different bit rates to encode data stored in the plurality of physical management units under different data writing situations, the data encoding and storage mechanism under different data writing situations may be effectively optimized.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
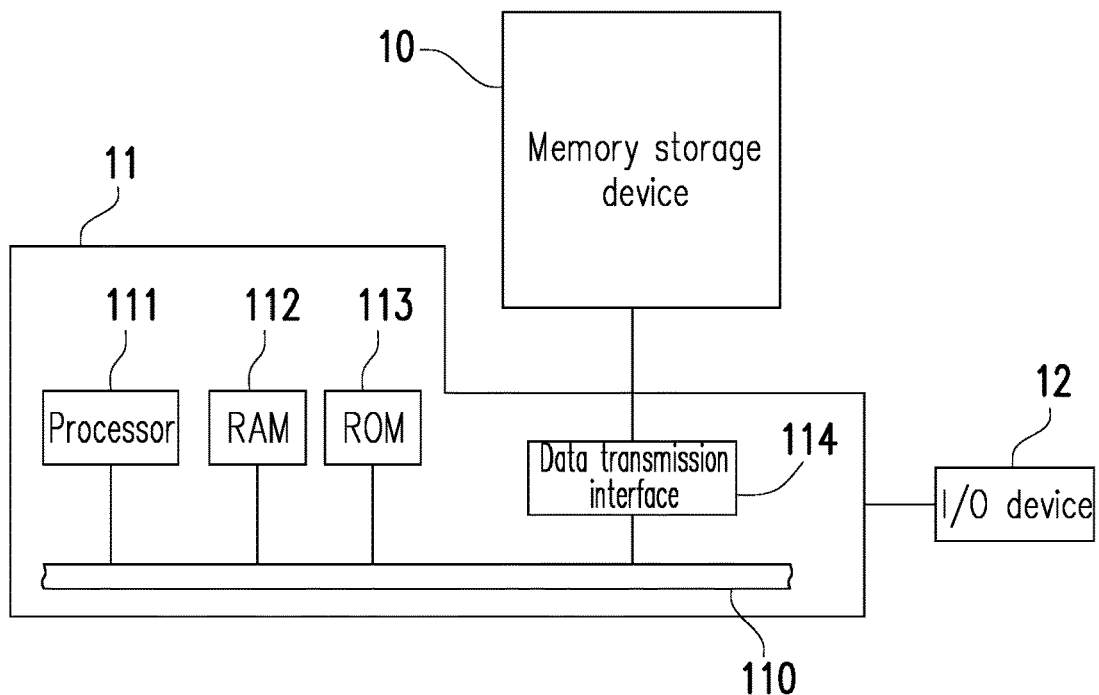
FIG. 1 is a schematic diagram of a host system, a memory storage device, and an input/output (I/O) device shown according to an exemplary embodiment of the invention.
Figure 2:
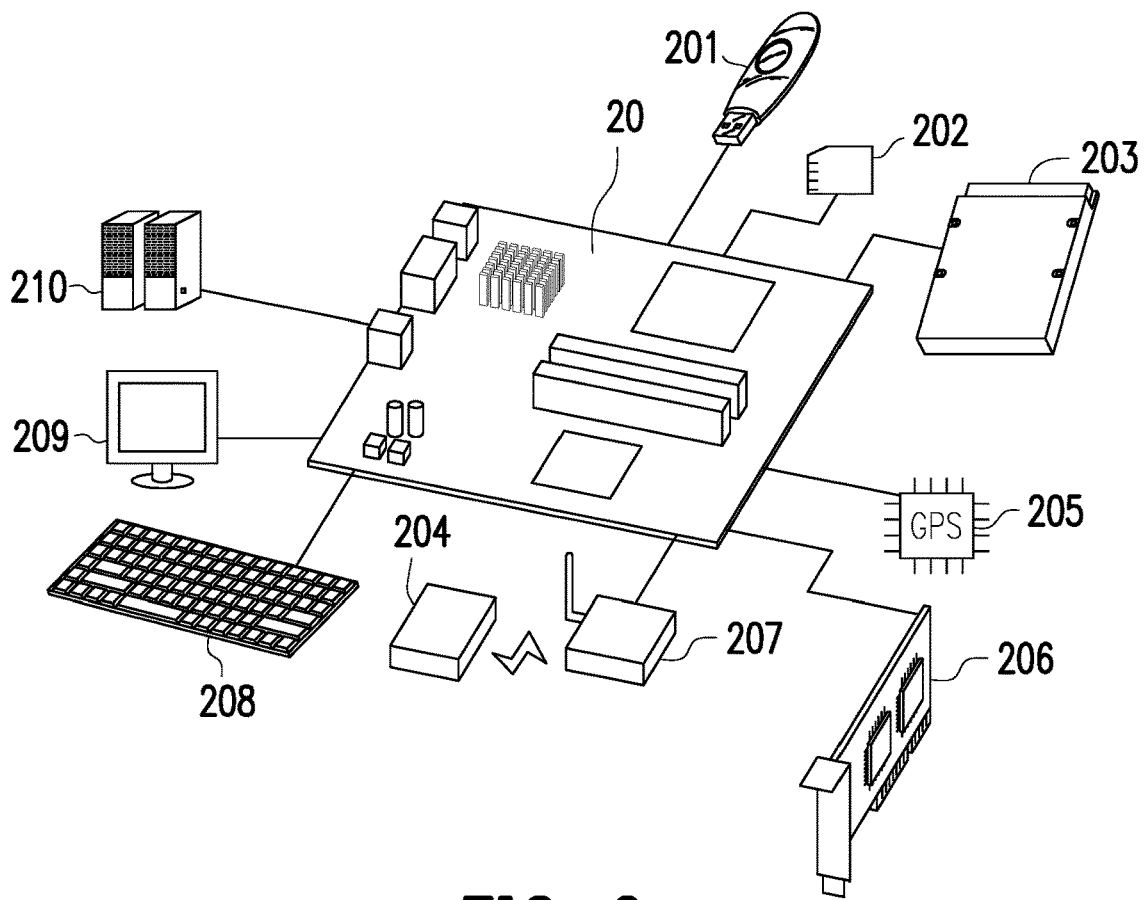
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
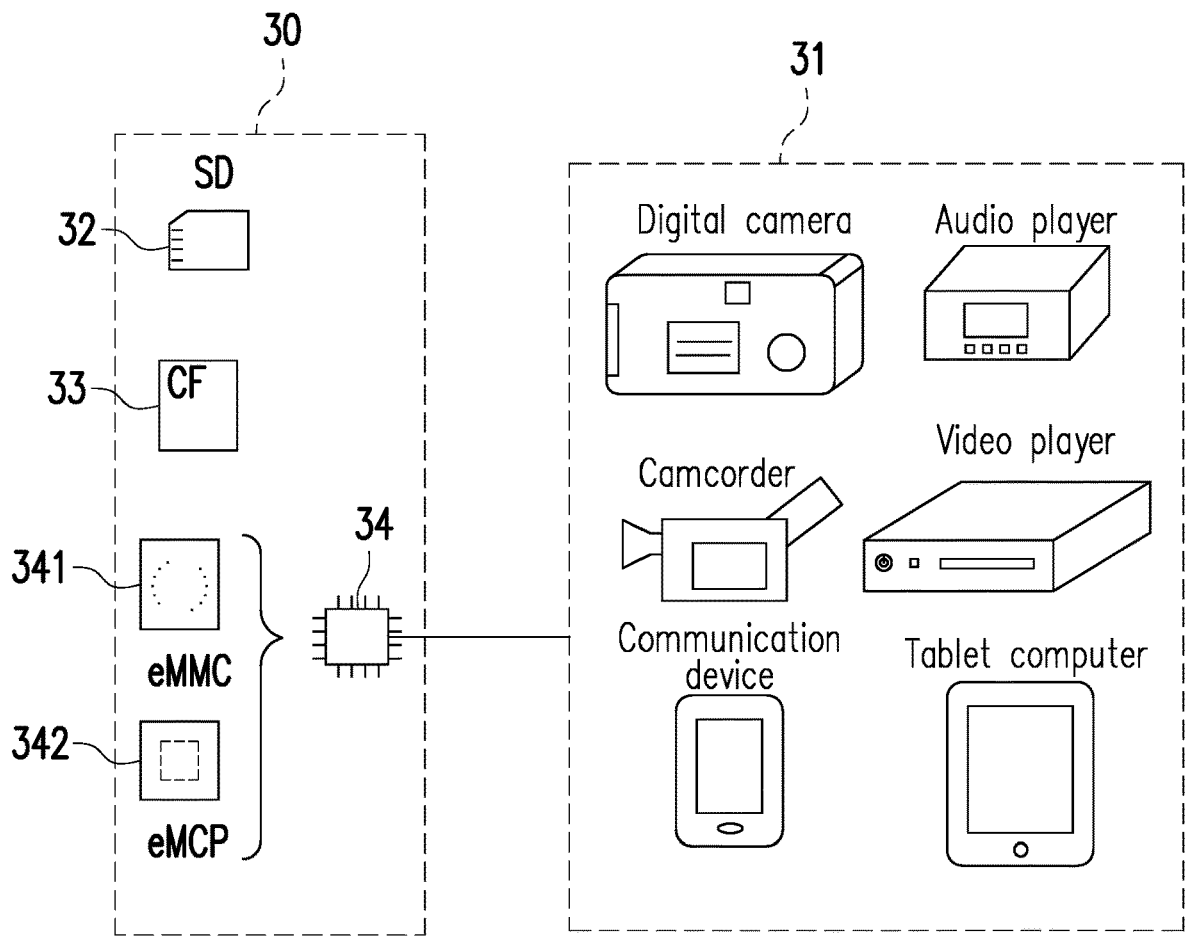
FIG. 3 is a schematic of a host system and a memory storage device shown according to an exemplary embodiment of the disclosure.

FIG. 3 is a schematic of a host system and a memory storage device shown according to an exemplary embodiment of the disclosure.

Referring to FIG. 3, the memory storage device 30 may be used in conjunction with the host system 31 to store data. For example, the host system 31 may be a system such as a digital camera, a camcorder, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
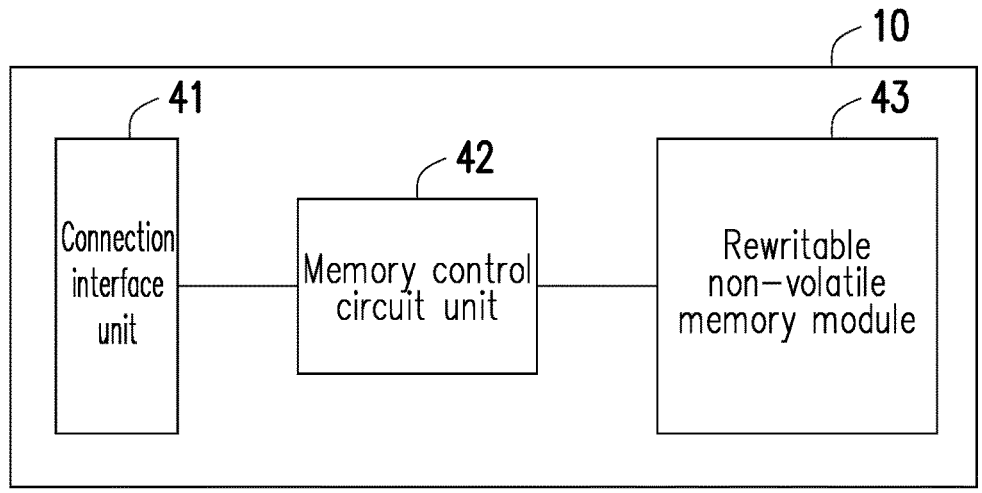
FIG. 4 is a schematic diagram of a memory storage device shown according to an exemplary embodiment of the invention.

FIG. 4 is a schematic diagram of a memory storage device shown according to an exemplary embodiment of the invention.

Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may be communicated with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I(UHS-I) interface standard, Ultra High Speed-II(UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 404 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If one memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit region and a redundancy bit region. The data bit region contains a plurality of physical pages configured to store user data, and the redundancy bit region is configured to store system data (for example, management data such as an error correcting code (ECC)). In an exemplary embodiment, the data bit region contains 32 physical pages, and the size of one physical sector is 512 bytes (B). However, in other exemplary embodiments, the data bit region may also contain 8, 16, or a greater or lesser number of physical pages, and the size of each of the physical pages may also be greater or smaller. Moreover, the physical erasing unit is the smallest unit of erasing. That is, each of the physical erase units contains the smallest number of memory cells erased together. For example, the physical erasing unit is a physical block.

Figure 5:
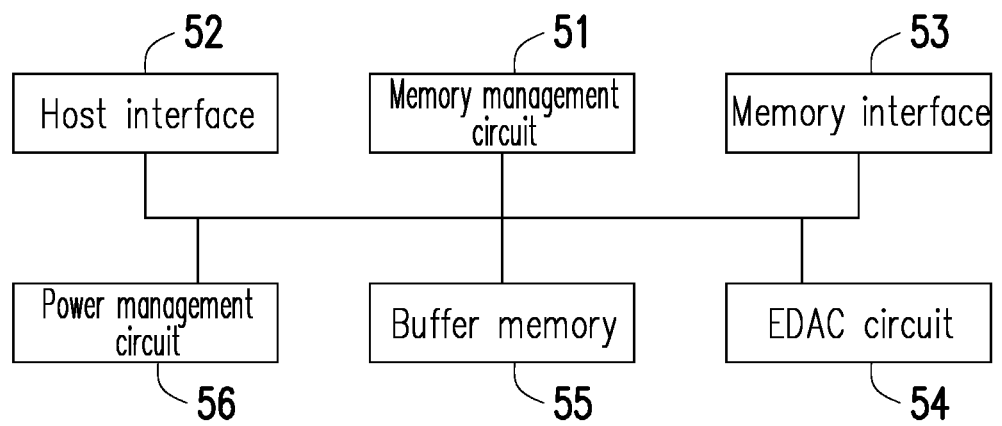
FIG. 5 is a schematic diagram of a memory control circuit unit shown according to an exemplary embodiment of the invention.

FIG. 5 is a schematic diagram of a memory control circuit unit shown according to an exemplary embodiment of the invention.

Referring to FIG. 5, the memory control circuit unit 42 includes a memory management circuit 51, a host interface 52, and a memory interface 53. The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific region (for example, the system region in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the execution of corresponding operations.

The host interface 52 is coupled to the memory management circuit 51. The memory management circuit 51 may be communicated with the host system 11 via the host interface 52. The host interface 52 may be used to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53. Specifically, if the memory management circuit 51 is to access the rewritable non-volatile memory module 43, the memory interface 53 sends a corresponding command sequence. For example, the command sequence may include a write command sequence instructing data writing, a read command sequence instructing data reading, an erase command sequence instructing data erasing, and corresponding command sequences configured to instruct various memory operations (such as changing read voltage level or performing a garbage collection (CC) operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when a command sequence is read, information such as read identification code or memory address is included.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to execute an error detection and correction operation to ensure the correctness of data. Specifically, when the memory management circuit 51 receives a write command from the host system 11, the error detection and correction circuit 54 generates a corresponding error correcting code (ECC) and/or an error detecting code (EDC) for data corresponding to the write command, and the memory management circuit 51 writes the data corresponding to the write command and the corresponding ECC and/or EDC into the rewritable non-volatile memory module 43. Next, when data is read from the rewritable non-volatile memory module 43, the memory management circuit 51 reads the ECC and/or the EDC corresponding to the data at the same time, and the error detection and correction circuit 54 executes an error detection and correction operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
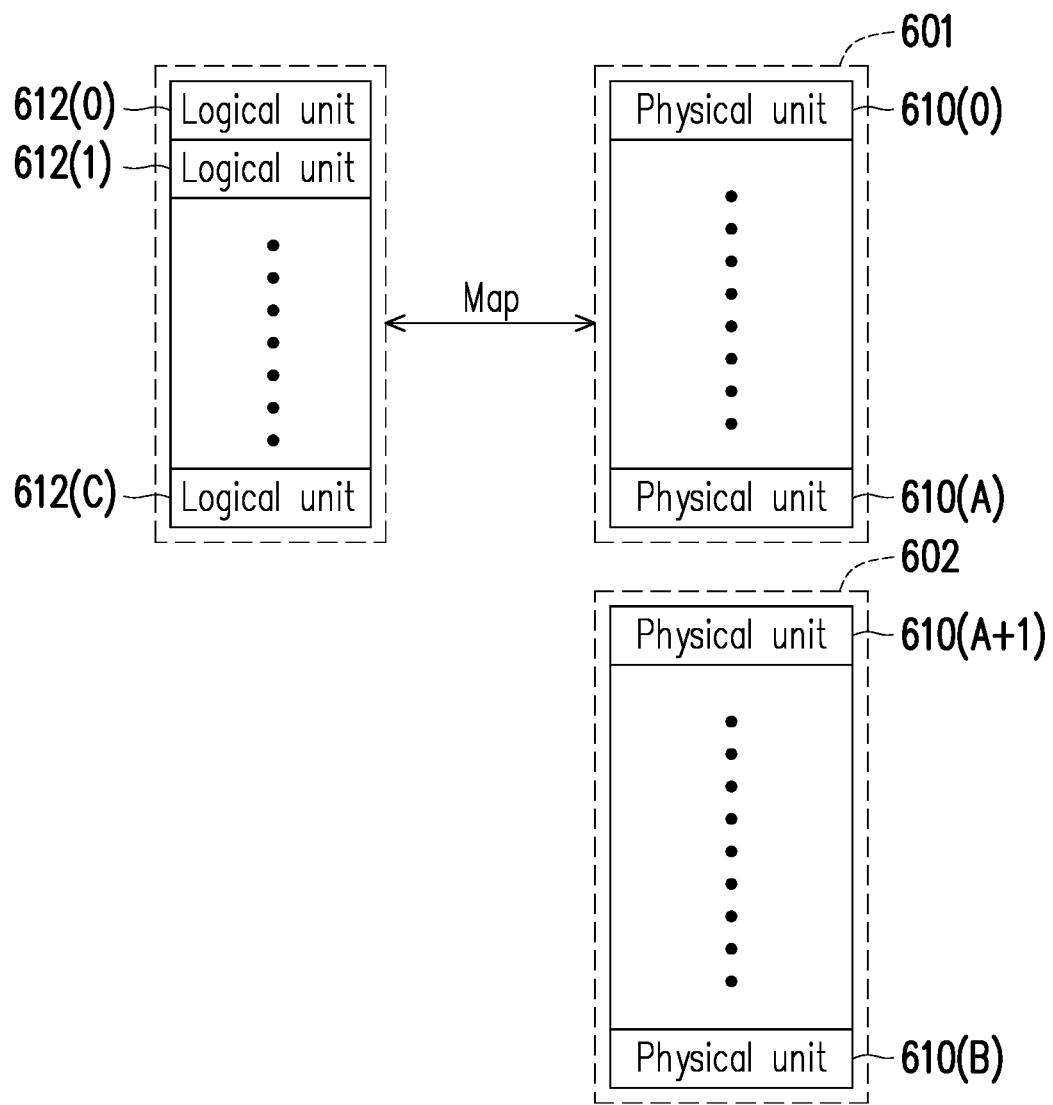
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention.

Referring to FIG. 6, the memory management circuit 51 may logically group physical units 610(0) to 610(B) in the rewritable non-volatile memory module 43 into a storage region 601 and a spare region 602. In an exemplary embodiment, one physical unit refers to one physical programming unit. However, in another exemplary embodiment, one physical unit may also include a plurality of physical programming units.

The physical units 610(0) to 610(A) in the storage region 601 are configured to store user data (for example, user data from the host system 11 in FIG. 1). For example, the physical units 610(0) to 610(A) in the storage region 601 may store valid data and/or invalid data. The physical units 610(A+1) to 610(B) in the spare region 602 do not store data (for example, valid data). For example, if a certain physical unit does not store valid data, this physical unit may be associated (or added) to the spare region 602. In addition, the physical units in the spare region 602 (or physical units that do not store valid data) may be erased. When new data is written, one or a plurality of physical units may be extracted from the spare region 602 to store the new data. In an exemplary embodiment, the spare region 602 is also referred to as a free pool.

The memory management circuit 51 may configure logical units 612(0) to 612(C) to map the physical units 610(0) to 610(A) in the storage region 601. In an exemplary embodiment, each of the logical units corresponds to one logical address. For example, one logical address may include one or a plurality of logical block addresses (LBAs) or other logical management units. In an exemplary embodiment, one logical unit may also correspond to one logical programming unit or formed by a plurality of continuous or discontinuous logical addresses. A, B, and C are all positive integers and may be adjusted according to practical needs, which are not limited in the invention.

It should be mentioned that, one logical unit may be mapped to one or a plurality of physical units. If a certain physical unit is currently mapped by a certain logical unit, the data currently stored in this physical unit includes valid data. On the other hand, if a certain physical unit is not currently mapped by any logical unit, the data currently stored in this physical unit is invalid data.

The memory management circuit 51 may record the management data describing the mapping relationship between logical units and physical units (also referred to as logical-to-physical mapping information) in at least one logical-to-physical mapping table. When the host system 11 is to read data from the memory storage device or write data to the memory storage device 10, the memory management circuit 51 may access the rewritable non-volatile memory module 43 according to the information in the logical-to-physical mapping table.

Figure 7:
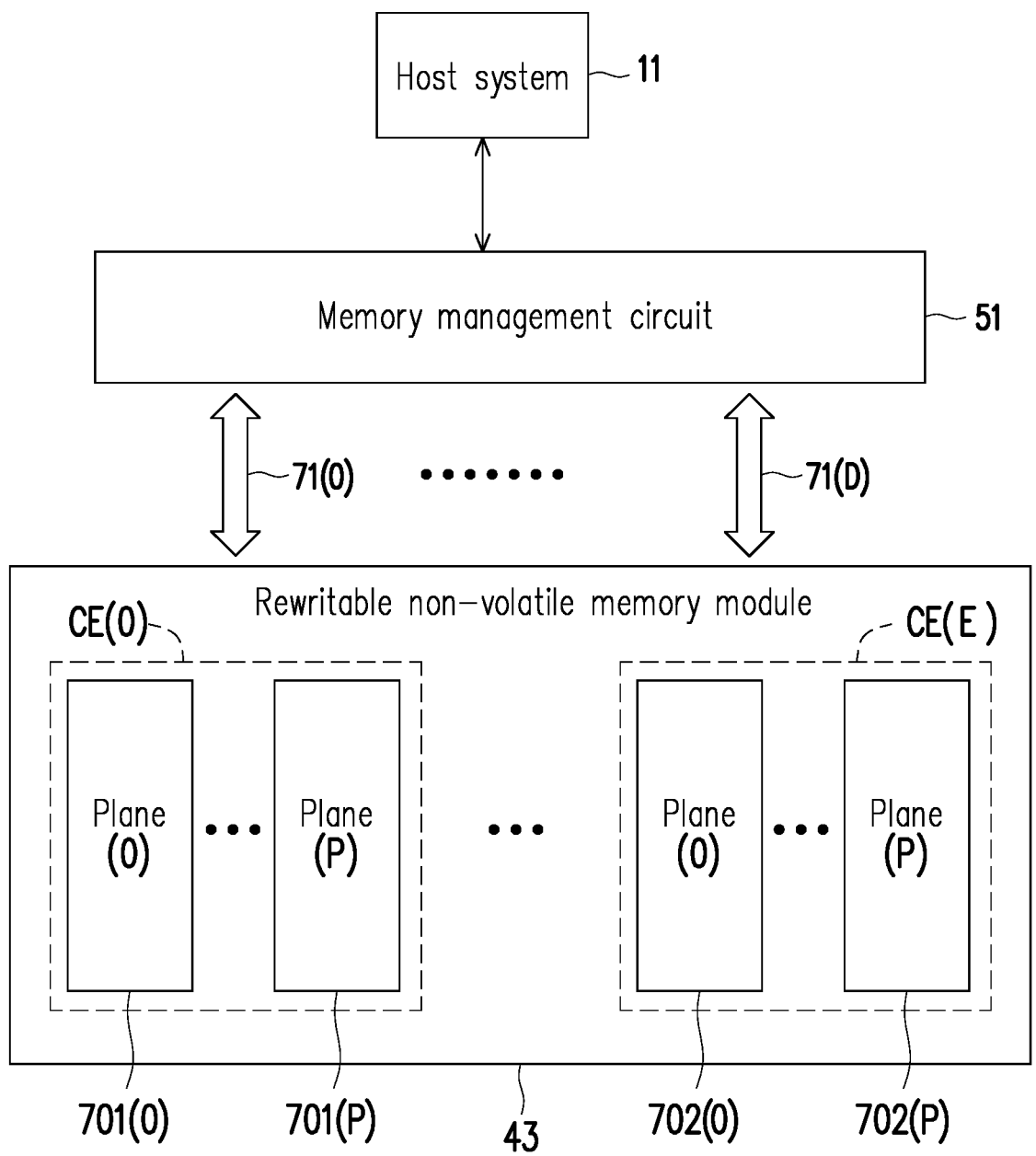
FIG. 7 is a schematic diagram of a system architecture of a memory storage device shown according to an exemplary embodiment of the invention.

FIG. 7 is a schematic diagram of a system architecture of a memory storage device shown according to an exemplary embodiment of the invention.

Referring to FIG. 7, the rewritable non-volatile memory module 43 may include a plurality of chip enabled (CE) regions CE(0) to CE(E). For example, the rewritable non-volatile memory module 43 may include one or a plurality of dies. The dies are obtained by laser cutting from a wafer. Each of the dies may be divided into one or a plurality of CE regions. Each of the CE regions CE(0) to CE(E) may contain one or a plurality of planes (also referred to as memory planes, marked as plane(0) to plane(P) in FIG. 7). Each of the planes may contain a plurality of physical units.

It should be noted that whether a certain CE region may be accessed may be controlled by the CE signal corresponding to the CE region. For example, when the CE signal corresponding to the CE region CE(i) is pulled up, the rewritable non-volatile memory module 43 may read data from the CE region CE(i) or store data in the CE region CE(i). However, if the CE signal corresponding to the CE region CE(i) is not pulled up, the rewritable non-volatile memory module 43 may not read data from the CE region CE(i) or store data in the CE region CE(i).

It should be noted that, in the present exemplary embodiment, each of the CE regions CE(0) to CE(E) contains the same number of planes as an example. For example, the CE region CE(0) contains planes 701(0) to 701(P), and the CE region CE(E) contains planes 702(0) to 702(P), and so on. However, the total number of planes (i.e., E) in different CE regions may also be different, which is not limited by the invention. In addition, in an exemplary embodiment, the plane (i) may also contain a plurality of planes.

The memory management circuit 51 may access the rewritable non-volatile memory module 43 via channels (also referred to as memory channels) 71(0) to 71(D). In particular, each of the channels 71(0) to 71(D) may be configured to access a specific CE region. For example, the channel 71(i) may be configured to access CE region (i). In addition, the values of D, E, and P may be adjusted according to practical requirements, which are not limited in the invention.

Figure 8:
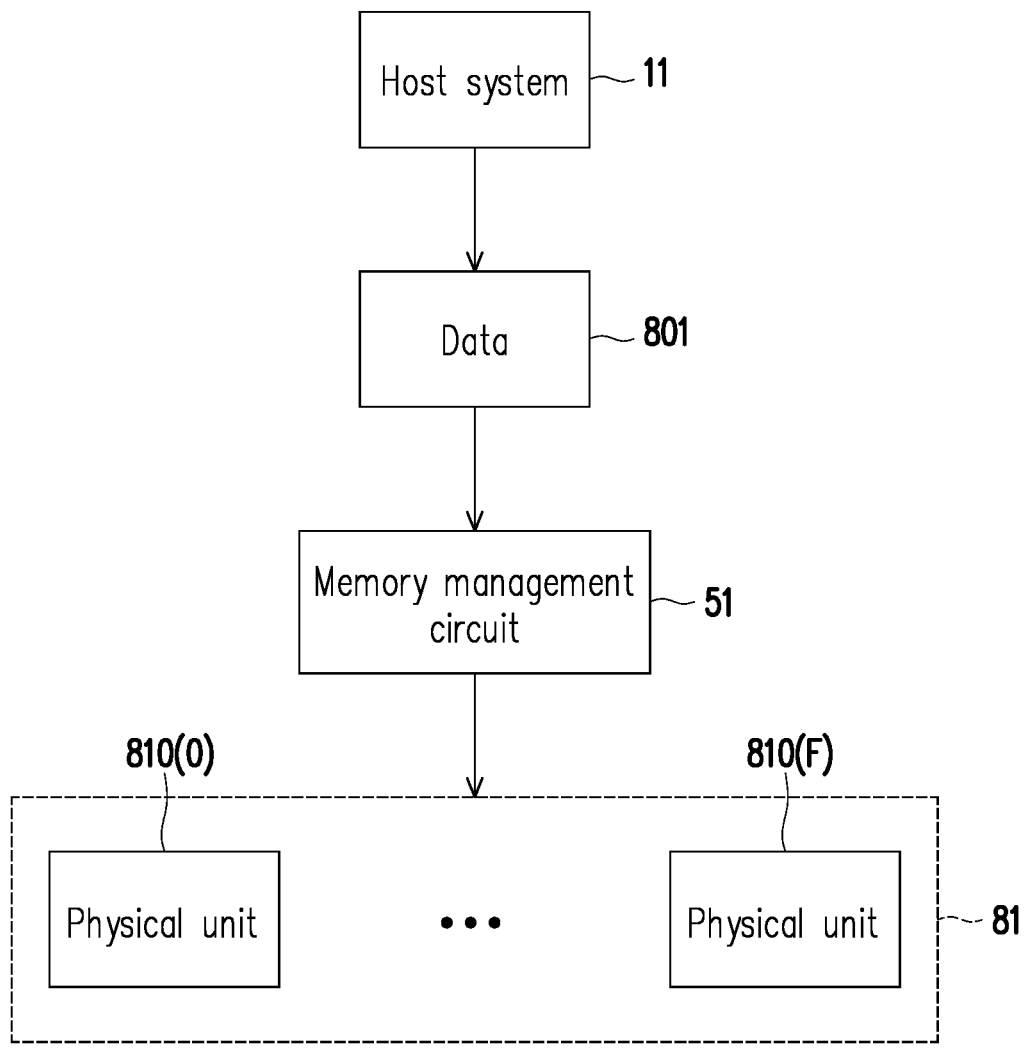
FIG. 8 is a schematic diagram of a host write operation shown according to an exemplary embodiment of the invention.

FIG. 8 is a schematic diagram of a host write operation shown according to an exemplary embodiment of the invention.

Referring to FIG. 8, the memory management circuit 51 may execute a host write operation to store data 801 from the host system 11. For example, in a host write operation, the memory management circuit 51 may receive a write command from the host system 11. This write command may instruct to store the data 801. The memory management circuit 51 may store the data 801 in a start-up unit (also referred to as an on unit) 81 according to the write command. For example, the start-up unit 81 may include physical units 810(0) to 810(F). The physical units 810(0) to 810(F) may be selected from the spare region 602 of FIG. 6.

Figure 9:
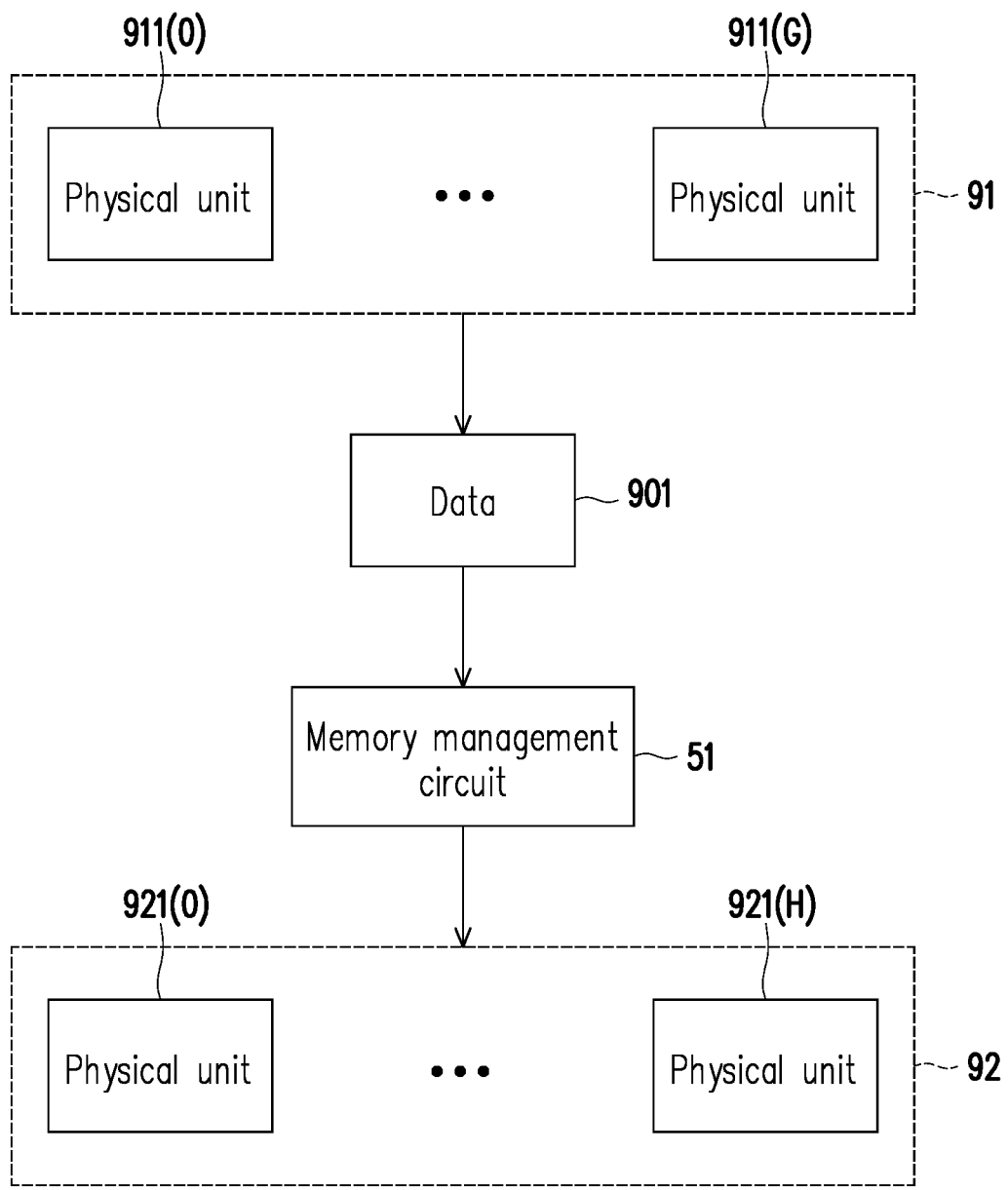
FIG. 9 is a schematic diagram of a data consolidation operation shown according to an exemplary embodiment of the invention.

FIG. 9 is a schematic diagram of a data consolidation operation shown according to an exemplary embodiment of the invention.

Referring to FIG. 9, the memory management circuit 51 may also execute a data consolidation operation to release new spare physical units. For example, new spare physical units may be associated or added to the spare region 602. For example, in a data consolidation operation, the memory management circuit 51 may collect data 901 from a source unit (also referred to as a source block or a source node) 91. For example, the source unit 91 may include physical units 911(0) to 911(G). The physical units 911(0) to 911(G) may be selected from the storage region 601 of FIG. 6. The collected data 901 includes valid data. Then, the memory management circuit 51 may centrally store the data 901 in a target unit (also referred to as a target block or a target node) 92. For example, the target unit 92 may include physical units 921(0) to 921(H). The physical units 921(0) to 921(H) may be selected from the spare region 602 of FIG. 6. Moreover, in a data consolidation operation, if all valid data stored in the source unit 91 is collected and stored in the target unit 92, the source unit 91 may be erased and associated or added in the spare region 602 as a new spare physical unit. In an exemplary embodiment, the data consolidation operation may include a garbage collection operation.

In an exemplary embodiment, the memory management circuit 51 may manage the physical units in the rewritable non-volatile memory module 43 via a plurality of physical management units. For example, one physical management unit includes a plurality of physical units, and one physical management unit may correspond to one die, one CE region, or one plane in the rewritable non-volatile memory module 43. Moreover, the memory management circuit 51 may use the physical management unit as an access unit to store data in the rewritable non-volatile memory module 43 or read data from the rewritable non-volatile memory module 43.

It should be noted that, in a host write operation and a data consolidation operation, before or after the data (also referred to as target data) is stored in the rewritable non-volatile memory module 43, the target data may be encoded to facilitate the correction of errors in the read data in a subsequent reading of the target data. For example, the memory management circuit 51 may instruct the error detection and correction circuit 54 to encode the target data to generate parity data corresponding to the target data. This parity data may be configured to protect the target data. Then, when the target data is read from the rewritable non-volatile memory module 43, the parity data may be read together. The error detection and correction circuit 54 may decode the target data according to the parity data to correct the error in the target data.

It should be noted that, the encoding of the target data by the error detection and correction circuit 54 means performing multi-physical unit encoding on the target data via the error detection and correction circuit 54. For example, the error detection and correction circuit 54 may perform multi-physical unit encoding on the target data using an encoding/decoding algorithm such as exclusive OR (XOR) or Reed-Solomon (RS) code. Furthermore, the invention does not limit the encoding/decoding algorithm adopted by the error detection and correction circuit 54.

In an exemplary embodiment, multi-physical unit encoding is also referred to as cross-physical unit encoding. For example, assuming that the data in the target data may be stored continuously or dispersedly in a plurality of physical units, the error detection and correction circuitry 54 may execute multi-physical unit encoding on these data to generate the parity data. Next, when at least a portion of the target data is read from the rewritable non-volatile memory module 43, if the error in data read from a particular physical unit may not be corrected based on the error correcting code and/or the error detecting code in a single physical unit, the memory management circuit 51 may further read the parity data from the rewritable non-volatile memory module 43. Next, the error detection and correction circuit 54 may perform multi-physical unit decoding on the target data according to the parity data in an attempt to correct the error via an encoding protection mechanism between the plurality of physical units. In an exemplary embodiment, multi-physical unit decoding is also referred to as cross-physical unit decoding. In an exemplary embodiment, cross-physical unit encoding and decoding may include cross-physical management unit encoding and decoding.

In an exemplary embodiment, the memory management circuit 51 may receive data (also referred to as first data) from the host system 11. For example, the first data is entrained in one or a plurality of write commands. For example, the first data may include the data 801 in FIG. 8. During a host write operation, the memory management circuit 51 may instruct the rewritable non-volatile memory module 43 to store the first data.

In particular, in a host write operation, the memory management circuit 51 may instruct the error detection and correction circuit 54 to encode the first data based on a specific code rate (also referred to as a first code rate) to generate parity data (also referred to as first parity data). The first parity data may be configured to protect the first data. Then, the memory management circuit 51 may send one or a plurality of write command sequences (also referred to as first write command sequences) to the rewritable non-volatile memory module 43. The first write command sequences may instruct the rewritable non-volatile memory module 43 to store the first data and the first parity data in a portion of the physical management units (also referred to as the first physical management units) in the plurality of physical management units.

Figure 10:
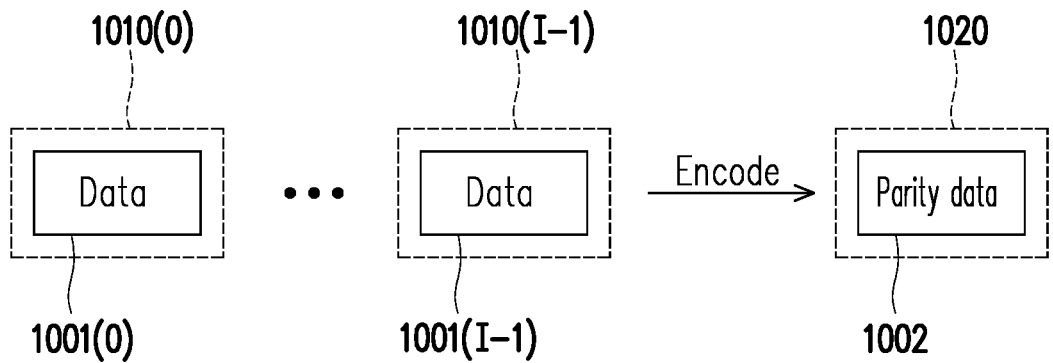
FIG. 10 is a schematic diagram of encoding first data in a host write operation shown according to an exemplary embodiment of the invention.

FIG. 10 is a schematic diagram of encoding first data in a host write operation shown according to an exemplary embodiment of the invention.

Referring to FIG. 10, in a host write operation, the memory management circuit 51 may instruct the error detection and correction circuit 54 to encode (i.e., multi-physical unit encoding) data 1001(0) to 1001(I−1) (i.e., first data) based on a first code rate to generate parity data 1002 (i.e., first parity data). The memory management circuit 51 may send a first write command sequence to instruct the rewritable non-volatile memory module 43 to continuously or dispersedly store the data 1001(0) to 1001(I−1) in physical management units 1010(0) to 1010(I−1) and store the parity data 1002 in a physical management unit 1020. It should be noted that the physical management units 1010(0) to 1010(I−1) and 1020 are located on different dies, CE regions, or planes, respectively. In addition, the physical management units 1010(0) to 1010(I−1) and 1020 belong to the first physical management units. Next, when at least a portion of the data in the data 1001(0) to 1001(I−1) is read, the error detection and correction circuit 54 may execute multi-physical unit decoding via the parity data 1002 and other portions of the data 1001(0) to 1001(I−1) in an attempt to correct the error in the data read via a cross-physical unit data protection mechanism.

Moreover, the memory management circuit 51 may collect data (also referred to as second data) from the rewritable non-volatile memory module 43. For example, the second data contains data collected from the source unit via a data consolidation operation. For example, the second data may include the data 901 in FIG. 9. During a data consolidation operation, the memory management circuit 51 may instruct the rewritable non-volatile memory module 43 to store the second data.

In particular, in a data consolidation operation, the memory management circuit 51 may instruct the error detection and correction circuit 54 to encode the second data based on another code rate (also referred to as a second code rate) to generate parity data (also referred to as second parity data). The second parity data may be configured to protect the second data. Then, the memory management circuit 51 may send one or a plurality of write command sequences (also referred to as second write command sequences) to the rewritable non-volatile memory module 43. The second write command sequences may instruct the rewritable non-volatile memory module 43 to store the second data and the second parity data in a portion of the physical management units (also referred to as the second physical management units) in the plurality of physical management units.

Figure 11:
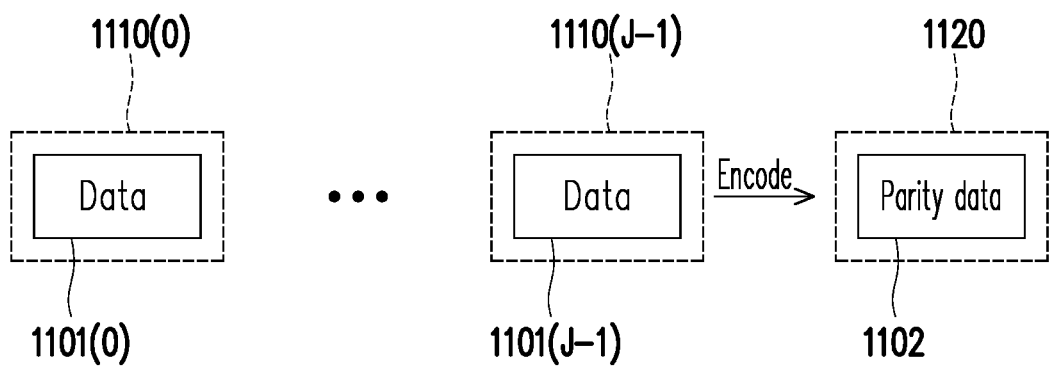
FIG. 11 is a schematic diagram of encoding second data in a data consolidation operation shown according to an exemplary embodiment of the invention.

FIG. 11 is a schematic diagram of encoding second data in a data consolidation operation shown according to an exemplary embodiment of the invention.

Referring to FIG. 11, in a data consolidation operation, the memory management circuit 51 may instruct the error detection and correction circuit 54 to encode (i.e., multi-physical unit encoding) data 1101(0) to 1101(J−1) (i.e., second data) based on a second code rate to generate parity data 1102 (i.e., second parity data). The memory management circuit 51 may send the second write command sequences to instruct the rewritable non-volatile memory module 43 to continuously or dispersedly store the data 1101(0) to 1101(J−1) in the physical management units 1110(0) to 1110(J−1) and store the parity data 1102 in the physical management unit 1120. It should be noted that the physical management units 1110(0) to 1110(J–1) and 1120 are located on different dies, CE regions, or planes, respectively. In addition, the physical management units 1110(0) to 1110(J–1) and 1120 belong to the second physical management units. Next, when at least a portion of the data in the data 1101(0) to 1101(J–1) is read, the error detection and correction circuit 54 may execute multi-physical unit decoding via the parity data 1102 and other portions of the data 1101(0) to 1101(J–1) in an attempt to correct the error in the data read via a cross-physical unit data protection mechanism.

It should be noted that, in the exemplary embodiments of FIG. 10 and FIG. 11, I is less than J. For example, I and J may be 16 and 32, respectively. In addition, the values of I and J may be adjusted according to practical needs, as long as the restriction that I is less than J is satisfied.

In an exemplary embodiment, the total number of the first physical management units may be less than the total number of the second physical management units and/or the data length of the first data may be shorter than the data length of the second data. Taking FIG. 10 and FIG. 11 as examples, I is less than J. Therefore, the total number of the physical management units 1010(0) to 1010(I–1) and 1020 (i.e., I+1) is less than the total number of the physical management units 1110(0) to 1110(J–1) and 1120 (i.e., J+1), and/or the total data length of the data 1001(0) to 1001(I–1) is shorter than the total data length of the data 1101(0) to 1101(J–1).

In an exemplary embodiment, in the case of generating the first parity data and the second parity data having the same data length, the protection capability of the first parity data to the first data is higher than the protection capability of the second parity data to the second data. Taking FIG. 10 and FIG. 11 as examples, I is less than J. Therefore, in the case of generating the parity data 1002 and 1102 having the same data length, the protection capability of the parity data 1002 to the data 1001(0) to 1001(I–1) may be higher than the protection capability of the parity data 1102 to the data 1101(0) to 1101(J–1). For example, assuming that the data 1001(0) to 1001(I–1) and 1101(0) to 1101(J–1) all contain N error bits, the probability of N error bits in the data 1001(0) to 1001(I–1) being corrected according to the parity data 1002 may be higher than the probability of N error bits in the data 1101(0) to 1101(J–1) being corrected according to the parity data 1102.

In an exemplary embodiment, the first code rate may reflect the ratio between the data amount of the first data and the data amount of the first parity data, and the second code rate may reflect the ratio between the data amount of the second data and the data amount of the second parity data, and the first code rate may be less than the second code rate. For example, the first code rate and the second code rate may be calculated according to the following equations (1) and (2), respectively.

First code rate=data amount of first data/(data amount of first data+data amount of first parity data)  Equation (1)

Second code rate=data amount of second data/(data amount of second data+data amount of second parity data)  Equation (2)

Taking FIG. 10 and FIG. 11 as examples, the first code rate may reflect the ratio (i.e., 1:1) between the data amount of the data 1001(0) to 1001(I–1) and the data amount of the parity data 1002, and the second code rate may reflect the ratio (i.e., J:1) between the data amount of the data 1101(0) to 1101(J–1) and the data amount of the parity data 1102. For example, assuming that I and J are 16 and 32, respectively, the first code rate and the second code rate may be 16/17 and 32/33, respectively, and the first code rate is less than the second code rate. In an exemplary embodiment, the first code rate being less than the second code rate may also reflect that the protection capability of the first parity data to the first data is higher than the protection capability of the second parity data to the second data. It should be noted that, in another exemplary embodiment, in a different application management, the first bit rate may also be adjusted to be higher than the second bit rate or equal to the second bit rate, depending on practical requirements.

In an exemplary embodiment, the first data and the second data are both stored in the first physical management units and the second physical management units respectively via the same programming mode. For example, the programming mode may include SLC, MLC, TLC, QLC, or other programming modes. In an example in which both the first data and the second data are stored in the first physical management units and the second physical management units via the TLC programming mode, after the first data and the first parity data are stored in the first physical management units, a single memory unit in the first physical management units storing the first data (and the first parity data) may store 3 bits; similarly, after the second data and the second parity data are stored in the second physical management units, a single memory unit in the second physical management units storing the second data (and the second parity data) may also store 3 bits. Or, in an example in which both the first data and the second data are stored in the first physical management units and the second physical management units via the SLC programming mode, after the first data and the first parity data are stored in the first physical management units, a single memory unit in the first physical management units storing the first data (and the first parity data) may store 1 bit; similarly, after the second data and the second parity data are stored in the second physical management units, a single memory unit in the second physical management units storing the second data (and the second parity data) may also store 1 bit.

In an exemplary embodiment, before data is stored, the memory management circuit 51 may determine that the write operation to be executed is a host write operation or a data consolidation operation. If (in response to) the write operation to be executed is a host write operation, the memory management circuit 51 may instruct the error detection and correction circuit 54 to encode data to be stored (i.e., first data) based on a first code rate to generate corresponding parity data (i.e., first parity data). Then, the memory management circuit 51 may instruct a rewritable non-volatile memory module 43 to store the first data and the first parity data in the first physical management units. Taking FIG. 10 as an example, the first physical management units may include I+1 physical management units, wherein the first data is stored in I physical management units, and the first parity data is stored in 1 physical management unit.

Or, if (in response to) the write operation to be executed is a data consolidation operation, the memory management circuit 51 may instruct the error detection and correction circuit 54 to encode data to be stored (i.e., second data) based on a second code rate to generate corresponding parity data (i.e., first second data). Then, the memory management circuit 51 may instruct the rewritable non-volatile memory module 43 to store the second data and the second parity data in the second physical management units. Taking FIG. 11 as an example, the second physical management units may contain J+1 physical management units, wherein the second data is stored in J physical management units, the second parity data is stored in 1 physical management unit, and I is less than J.

Figure 12:
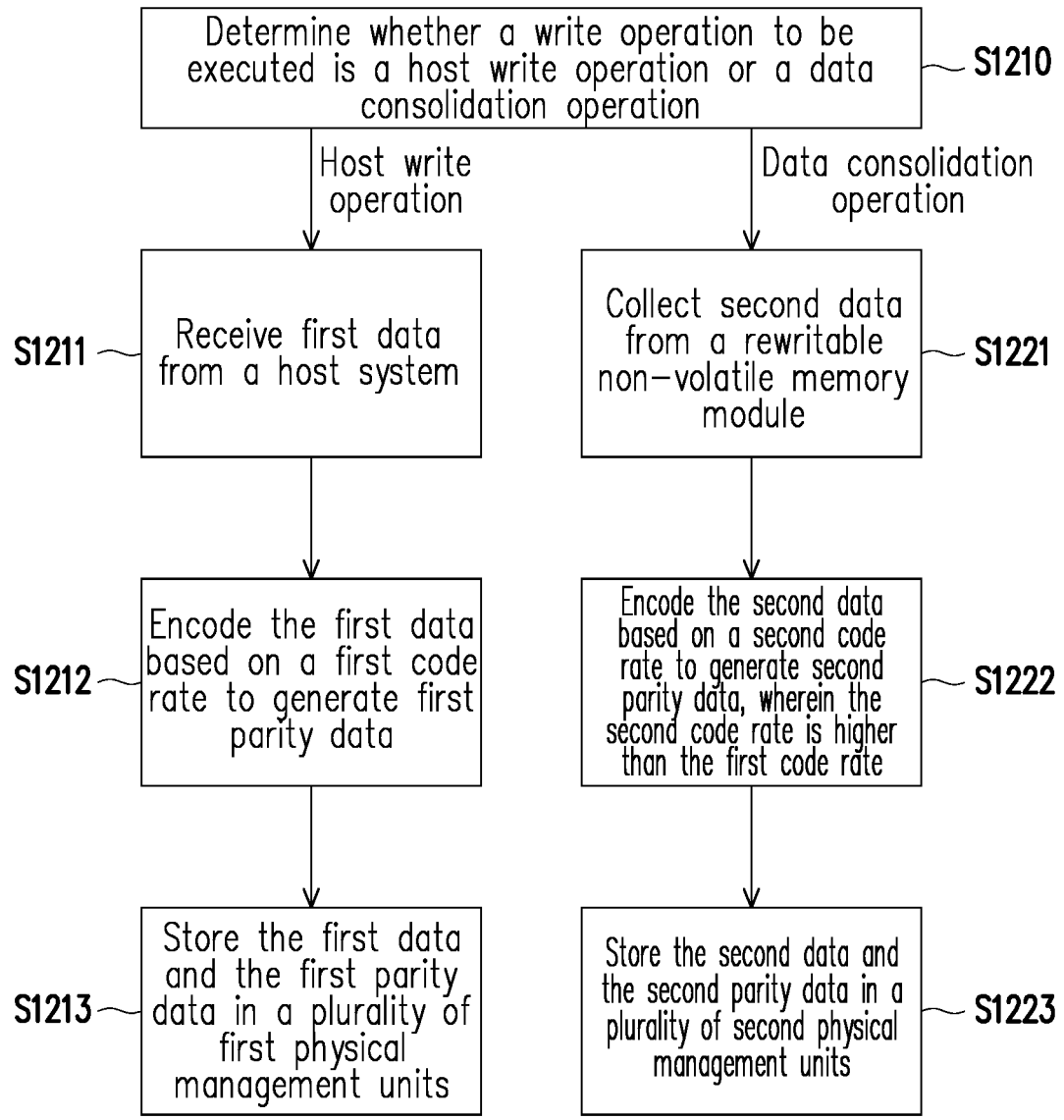
FIG. 12 is a flowchart of a data storage method shown according to an exemplary embodiment of the invention.

FIG. 12 is a flowchart of a data storage method shown according to an exemplary embodiment of the invention.

Referring to FIG. 12, in step S1210, it is determined that a write operation to be executed is a host write operation or a data consolidation operation. If (in response to) the write operation to be executed is a host write operation, in step S1211, the first data is received from a host system. In step S1212, the first data is encoded based on a first code rate to generate the first parity data. In step S1213, the first data and the first parity data are stored in the plurality of first physical management units. Alternatively, if (in response to) the write operation to be executed is a data consolidation operation, in step S1221, the second data is collected from a rewritable non-volatile memory module. In step S1222, the second data is encoded based on a second code rate to generate second parity data. In step S1223, the second data and the second parity data are stored in the plurality of second physical management units. In particular, the protection capability of the first parity data to the first data is higher than the protection capability of the second parity data to the second data, the total number of the first physical management units is less than the total number of the second physical management units, and/or the first code rate is less than the second code rate. It should be noted that, in an exemplary embodiment of FIG. 12, step S1210 may also be executed after step S1211 and/or S1221, which is not limited in the invention.

However, each step in FIG. 12 is as described in detail above, and is not repeated herein. It should be mentioned that, each step in FIG. 12 may be implemented as a plurality of program codes or circuits, and the present application is not limited thereto. Moreover, the method of FIG. 12 may be used with the above exemplary embodiments, and may also be used alone, and the present application is not limited thereto.

Based on the above, the data storage method, the memory storage device, and the memory control circuit unit proposed by the exemplary embodiments of the invention can, in the host write operation, store the first data and the first parity data in a relatively smaller number of first physical management units via a relatively lower code rate. In this way, on the premise of taking into account data access performance, the cross-physical unit protection capability of the first parity data to the first data may be maintained. Moreover, in the data consolidation operation (such as a garbage collection operation), the second data and the second parity data may be stored in a relatively larger number of second physical management units via a relatively higher code rate. Accordingly, the storage space occupied by the second parity data may be reduced as much as possible and/or the effective utilization rate of the storage space may be improved on the premise of not significantly affecting the cross-physical unit data protection capability. Therefore, in both the host writing operation and the data consolidation operation, the data encoding and storage mechanism may achieve a better balance.

Although the disclosure has been disclosed by the above embodiments, they are not intended to limit the disclosure. It is apparent to one of ordinary skill in the art that modifications and variations to the disclosure may be made without departing from the spirit and scope of the disclosure. Accordingly, the protection scope of the disclosure will be defined by the appended claims.

What is claimed is:

1. A data storage method, configured for a rewritable non-volatile memory module, wherein the rewritable non-volatile memory module comprises a plurality of physical management units, and the data storage method comprises:
   receiving first data from a host system;
   in response to the first data being received from the host system, encoding the first data based on a first code rate to generate first parity data;
   storing the first data and the first parity data in a plurality of first physical management units in the plurality of physical management units;
   collecting second data from a source unit in the rewritable non-volatile memory module via a garbage collection operation;
   in response to the second data being collected from the source unit in the rewritable non-volatile memory module via the garbage collection operation, encoding the second data based on a second code rate to generate second parity data, wherein the first code rate for encoding the first data from the host system is different from the second code rate for encoding the second data from the source unit; and
   storing the second data and the second parity data in a plurality of second physical management units in the plurality of physical management units,
   wherein the first data and the second data are respectively stored in the plurality of first physical management units and the plurality of second physical management units via a same programming mode.

2. The data storage method of claim 1, wherein a protection capability of the first parity data to the first data is higher than a protection capability of the second parity data to the second data.

3. The data storage method of claim 1, wherein a total number of the plurality of first physical management units is less than a total number of the plurality of second physical management units.

4. The data storage method of claim 1, wherein each of the plurality of physical management units corresponds to a die, a chip enabled region, or a plane in the rewritable non-volatile memory module.

5. The data storage method of claim 1, wherein the first code rate reflects a ratio between a data amount of the first data and a data amount of the first parity data, the second code rate reflects a ratio between a data amount of the second data and a data amount of the second parity data, and the first code rate is less than the second code rate.

6. A memory storage device, comprising:
   a connection interface unit configured to be coupled to a host system;
   a rewritable non-volatile memory module comprising a plurality of physical management units; and
   a memory control circuit unit coupled to the connection interface unit and the rewritable non-volatile memory module,
   wherein the memory control circuit unit is configured to:
   receive first data from a host system;
   in response to the first data being received from the host system, encode the first data based on a first code rate to generate first parity data;
   send a first write command sequence instructing storing the first data and the first parity data in a plurality of first physical management units in the plurality of physical management units;

collect second data from a source unit in the rewritable non-volatile memory module via a garbage collection operation;

in response to the second data being collected from the source unit in the rewritable non-volatile memory module via the garbage collection operation, encode the second data based on a second code rate to generate second parity data, wherein the first code rate for encoding the first data from the host system is different from the second code rate for encoding the second data from the source unit; and send a second write command sequence instructing storing the second data and the second parity data in a plurality of second physical management units in the plurality of physical management units, wherein the first data and the second data are respectively stored in the plurality of first physical management units and the plurality of second physical management units via a same programming mode.

7. The memory storage device of claim 6, wherein a protection capability of the first parity data to the first data is higher than a protection capability of the second parity data to the second data.

8. The memory storage device of claim 6, wherein a total number of the plurality of first physical management units is less than a total number of the plurality of second physical management units.

9. The memory storage device of claim 6, wherein each of the plurality of physical management units corresponds to a die, a chip enabled region, or a plane in the rewritable non-volatile memory module.

10. The memory storage device of claim 6, wherein the first code rate reflects a ratio between a data amount of the first data and a data amount of the first parity data, the second code rate reflects a ratio between a data amount of the second data and a data amount of the second parity data, and the first code rate is less than the second code rate.

11. A memory control circuit unit, configured to control a rewritable non-volatile memory module, wherein the rewritable non-volatile memory module comprises a plurality of physical management units, and the memory control circuit unit comprises:

a host interface configured to be coupled to a host system;

a memory interface configured to be coupled to the rewritable non-volatile memory module;

an error detection and correction circuit; and a memory management circuit coupled to the host interface, the memory interface, and the error detection and correction circuit, wherein the memory management circuit is configured to receive first data from a host system, the error detection and correction circuit is configured to, in response to the first data being received from the host system, encode the first data based on a first code rate to generate first parity data, the memory management circuit is further configured to send a first write command sequence instructing storing the first data and the first parity data in a plurality of first physical management units in the plurality of physical management units, the memory management circuit is further configured to collect second data from a source unit in the rewritable non-volatile memory module via a garbage collection operation, the error detection and correction circuit is further configured to, in response to the second data being collected from the source unit in the rewritable non-volatile memory module via the garbage collection operation, encode the second data based on a second code rate to generate second parity data, wherein the first code rate for encoding the first data from the host system is different from the second code rate for encoding the second data from the source unit, and the memory management circuit is further configured to send a second write command sequence instructing storing the second data and the second parity data in a plurality of second physical management units in the plurality of physical management units, wherein the first data and the second data are respectively stored in the plurality of first physical management units and the plurality of second physical management units via a same programming mode.

12. The memory control circuit unit of claim 11, wherein a protection capability of the first parity data to the first data is higher than a protection capability of the second parity data to the second data.

13. The memory control circuit unit of claim 11, wherein a total number of the plurality of first physical management units is less than a total number of the plurality of second physical management units.

14. The memory control circuit unit of claim 11, wherein each of the plurality of physical management units corresponds to a die, a chip enabled region, or a plane in the rewritable non-volatile memory module.

15. The memory control circuit unit of claim 11, wherein the first code rate reflects a ratio between a data amount of the first data and a data amount of the first parity data, the second code rate reflects a ratio between a data amount of the second data and a data amount of the second parity data, and the first code rate is less than the second code rate.

* * * * *